United States Patent [19]
Shimura et al.

[11] Patent Number: 5,825,993
[45] Date of Patent: Oct. 20, 1998

[54] INFORMATION PROCESSING APPARATUS AND OUTPUT APPARATUS

[75] Inventors: Akihiro Shimura, Tokyo; Satoshi Nagata, Tama; Yoshifumi Okamoto, Yokohama; Tetsuya Morita, Kawasaki; Shunya Mitsuhashi, Tokyo; Nobuhiko Sato, Kawasaki; Takanori Nishijima; Masaki Unishi, both of Tokyo, all of Japan

[73] Assignee: Canon Kabushiki Kaisha, Tokyo, Japan

[21] Appl. No.: 917,100

[22] Filed: Aug. 25, 1997

Related U.S. Application Data

[63] Continuation of Ser. No. 694,839, Aug. 9, 1996, abandoned, which is a continuation of Ser. No. 76,832, Jun. 15, 1993, abandoned.

[30] Foreign Application Priority Data

Jun. 19, 1992 [JP] Japan .................................. 4-186359

[51] Int. Cl.$^6$ ................................................... G06K 15/00
[52] U.S. Cl. ........................................... 395/115; 395/115
[58] Field of Search .................................... 395/101, 112, 395/113, 114, 115, 116, 848, 876, 877, 894; 358/404, 444, 261.4; 345/507, 512, 514, 518, 573

[56] References Cited

U.S. PATENT DOCUMENTS

| | | | |
|---|---|---|---|
| 4,941,108 | 7/1990 | Aoyagi et al. | ........................... 395/115 |
| 5,014,221 | 5/1991 | Mogul | ...................................... 364/519 |
| 5,050,100 | 9/1991 | Damon et al. | ........................... 395/115 |
| 5,084,831 | 1/1992 | Morikawa et al. | ...................... 395/116 |
| 5,108,207 | 4/1992 | Isobe et al. | ................................ 400/70 |
| 5,216,754 | 6/1993 | Sathi et al. | .............................. 395/115 |
| 5,382,968 | 1/1995 | Endoh | ..................................... 395/114 |

FOREIGN PATENT DOCUMENTS 412925  2/1991  European Pat. Off. .

*Primary Examiner*—Arthur G. Evans
*Attorney, Agent, or Firm*—Fitzpatrick, Cella, Harper & Scinto

[57] ABSTRACT

An information processing apparatus comprises acquiring means for acquiring a memory capacity of a printer connected through a bi-directional interface, compare means for comparing the memory capacity acquired by the acquiring means with a capacity of data to be outputted to the printer, and determination means for determining a memory size of a memory of the printer in accordance with the comparison result.

An output apparatus comprises receiving means for receiving memory size information determined by a capacity of data to be outputted from an information processing apparatus connected through a bi-directional interface and a capacity of a memory for storing the data, from the information processing apparatus, and setting means for dynamically setting a size of the memory for storing the data in accordance with the memory size information received by the receiving means.

172 Claims, 9 Drawing Sheets

INFORMATION PROCESSING APPARATUS AND OUTPUT APPARATUS

This application is a continuation of Application Ser. No. 08/694,839 filed Aug. 9, 1996, now abandoned, which was a continuation of Application Ser. No. 08/076,832 filed Jun. 15, 1993, now abandoned.

BACKGROUND OF THE INVENTION

1. Field of the Invention

The present invention relates to an information processing apparatus for sending data to an output apparatus such as a printer connected through a bi-directional interface, and an output apparatus for receiving data from an information processing apparatus such as a host computer and outputs data in accordance with the input data.

2. Related Background Art

In a recent recording apparatus of this type, output information inputted from a host computer is analyzed to develop bit map data as an output data of a printer engine such as a laser beam printer, and a laser beam modulated in accordance with the developed data is scanned and exposed to a photo-conductor drum to record an image.

A recording apparatus which can output data WYSIWYG-processed (What You See Is What You Get) by a host computer, that is, bit map developed data has also been put into practice.

On the other hand, a resolution power of a printer has been rapidly improved from 240 DPI to 300–400 DPI. As a result, a print memory of a predetermined capacity provided in the printer is not large enough to develop one full page of record data. Thus, a band recording system has been proposed in which the record data are sequentially developed into a band memory of a capacity which permits synchronization of the development of the record data and print processing speed of a printer engine to transfer the record data to the printer engine. Namely, the setting of one full page of memory and the setting of the band memory of a fixed capacity are switched in accordance with the capacity of the printer memory and the resolution power to attain the printing correctly.

However, in the switching to the band memory of the prior art, only the capacity of the printer memory and the resolution power are taken into account. As a result, when the WYSIWYG process becomes complex, namely, when page edit data which is mixture of graphics, characters, tables and images is to be printed, one page of record data to be actually outputted cannot be developed in spite of the fact that the memory has a capacity to store one page of record data. For example, when font data, hatching data, image data and page data relating to the print job are stored and a work to bit map-develop outline font is secured, it frequently happens that one page of record data cannot be developed, and the record information is not correctly outputted or the band memory of the fixed capacity cannot be secured.

SUMMARY OF THE INVENTION

It is an object of the present invention to provide an information processing apparatus which acquires a memory capacity of an output apparatus such as a printer connected thereto through a bi-directional interface to determine a required band size of a memory for each print job or each page in the job, and an output apparatus which receives memory size information corresponding to a capacity of data to be sent from an information processing apparatus such as a host computer connected thereto through a bi-directional interface to dynamically and variably set a memory optimal to the data to be sent in accordance with the memory size information.

In order to achieve the above object, the present invention provides an information processing apparatus comprising acquiring means for acquiring a memory capacity of a printer connected through a bi-directional interface, compare means for comparing the memory capacity acquired by the acquiring means with a capacity of data to be outputted to the printer, and determination means for determining a memory size of a memory of the printer in accordance with the comparison result.

Further, in order to achieve the above object, the present invention provides an output apparatus comprising receiving means for receiving memory size information determined by a capacity of data to be outputted from an information processing apparatus connected through a bi-directional interface and a capacity of a memory for storing the data, from the information processing apparatus, and setting means for dynamically setting a size of the memory for storing the data in accordance with the memory size information received by the receiving means.

In accordance with the present invention, the print memory capacity data of the printer connected to the host computer is acquired, the memory capacity and the capacity of the data to be outputted to the printer are compared, the band memory size on the printer memory is variably determined based on the comparison result, and the band memory of the determined size is dynamically secured on the printer memory in accordance with the determined memory map. Accordingly, the band memory which can process the recording process is effectively secured while the optimum memory map to the print memory capacity is dynamically set in accordance with the capacity of the data of the print job to be sent.

Further, the capacity data of the printer memory and the capacity of data of the print job to be sent are compared to determine the size of the band memory to be structured on the printer memory, and the band memory of the determined size is dynamically set on the printer memory by acquiring the determined band memory size data. Accordingly, even if the band memory capacity is tight by the storage of other record information because of the fixed capacity of the printer memory, the optimum band memory to the data of the print job to be outputted from the host computer can be effectively secured.

Accordingly, even if the memory capacity of the printer memory is limited, complex print process can be attained.

DETAILED DESCRIPTION OF THE PREFERRED EMBODIMENTS

Before describing a construction of an embodiment, constructions of a laser beam printer and an ink jet printer to which the embodiment is to be applied are explained with reference to FIGS. 1 to 3. A printer in the embodiment is not to be limited to the laser beam printer or the ink jet printer but it may be other type of printer.

Figure 1:
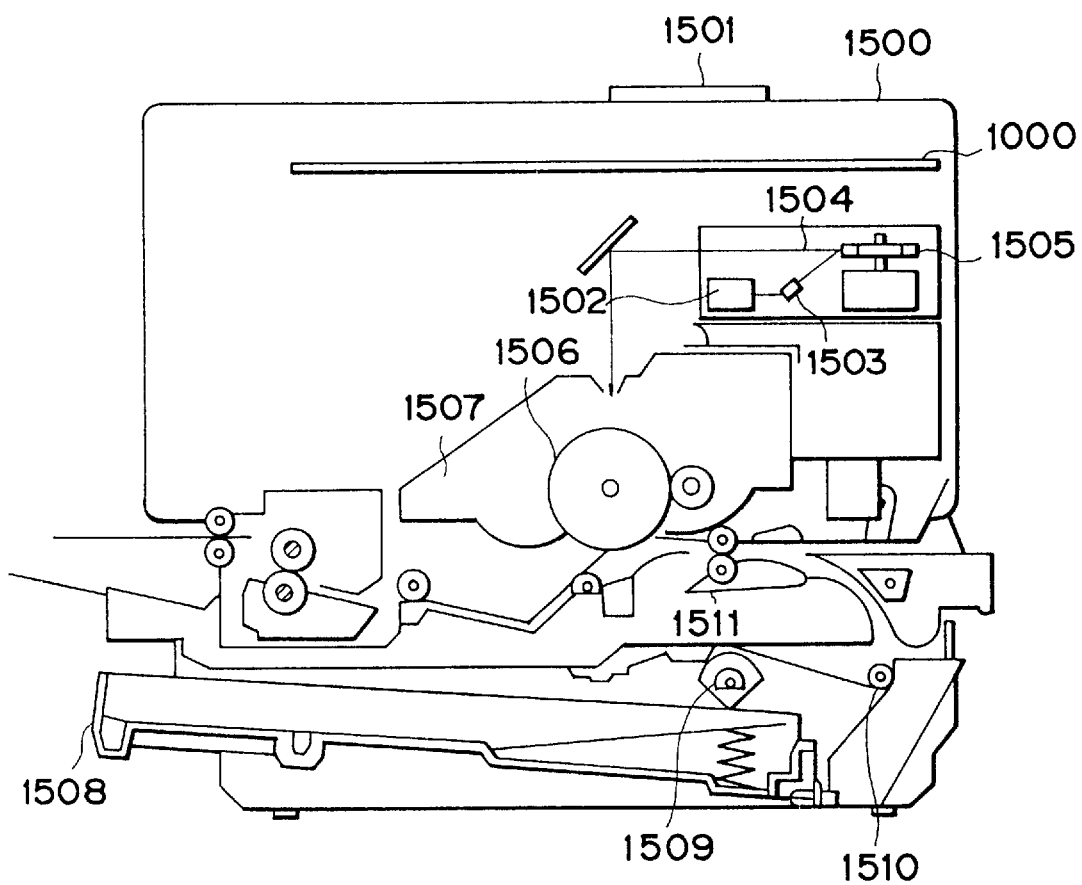
FIG. 1 shows a sectional view of a construction of a first recording apparatus to which the present invention is applied.

FIG. 1 shows a sectional view of a construction of a first recording apparatus to which the present invention is applied. It may be a laser beam printer (LBP).

In FIG. 1, numeral 1500 denotes an LBP main unit which receives print information (character codes), form information or macro instructions supplied from an externally connected host computer, stores them, generates a character pattern or a form pattern in accordance with the stored information, and forms an image on a record sheet which is a recording medium. Numeral 1501 denotes a console panel having console switches and LED displays arranged thereon, and numeral 1000 denotes a printer control unit for controlling the overall LBP main unit 1500 and analyzing the print information supplied from the host computer. The printer control unit 1000 converts the print information supplied from the host computer 100 to a corresponding video signal of a bit pattern and supplies it to a laser driver 1502, which drives a semiconductor laser 1503, and it turns on and off a laser beam 1504 emitted from a semiconductor laser 1503 in accordance with the input video signal. The laser beam 1504 is laterally swung by a rotating polygon mirror 1505 to scan and expose to an electrostatic drum 1506. Thus, an electrostatic latent image of a character pattern is formed on the electrostatic drum 1506. The latent image is developed by a developing unit 1507 arranged around the electrostatic drum 1506 and then transferred to a record sheet. The record sheet may be a cut sheet, and cut sheet recording sheets are contained in a sheet cassette 1508 mounted in the LBP 1500, and the sheet is taken into the apparatus by a sheet feed roller 1509 and a transport roller 1511, and it is supplied to the electrostatic drum 1506.

Figure 2:
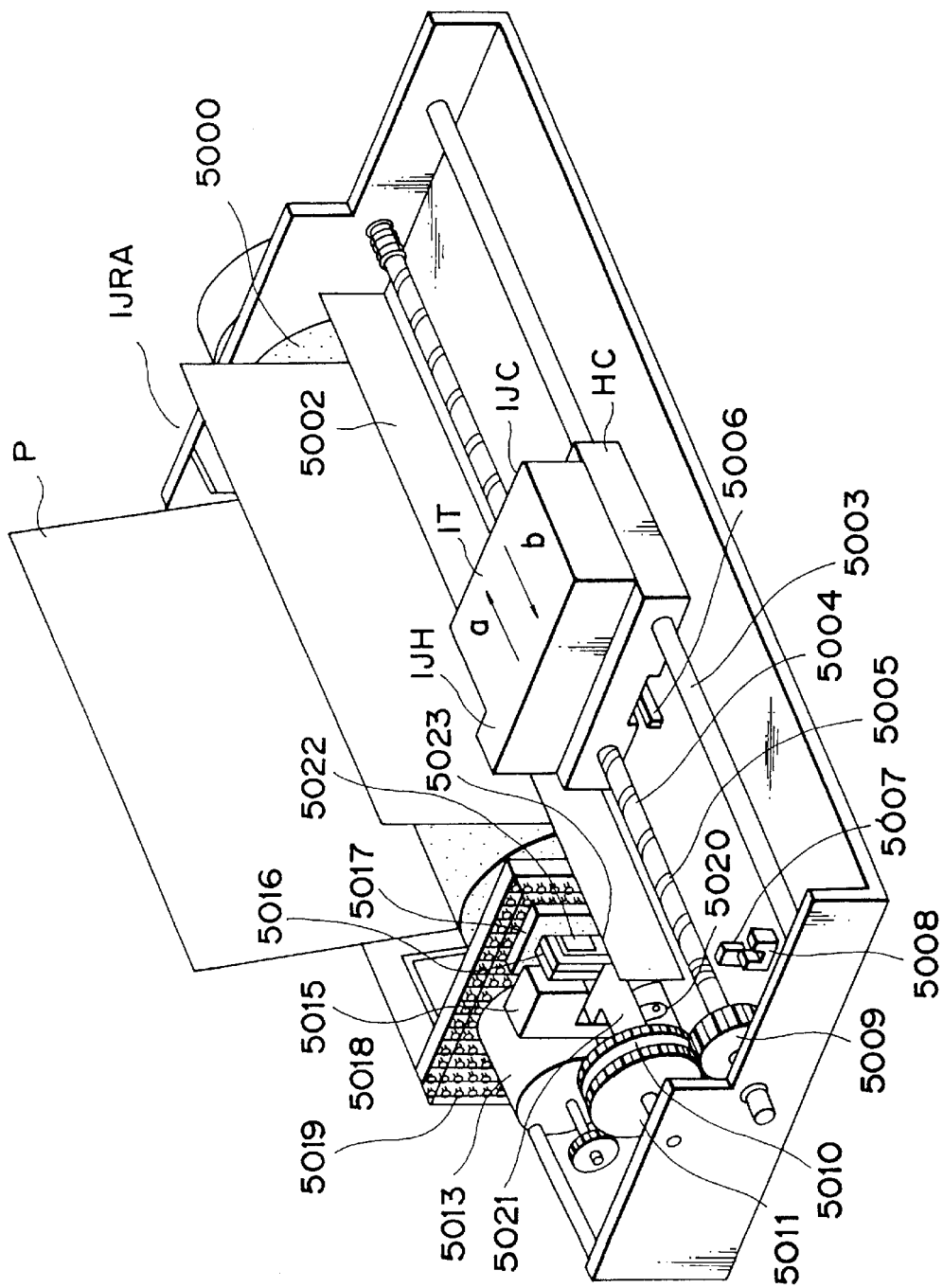
FIG. 2 shows an external view of a construction of a second recording apparatus to which the present invention is applied.

FIG. 2 shows an external view of a second recording apparatus to which the present invention is applied. It may be an ink jet recording apparatus (IJRA).

In FIG. 2, a carriage HC which engages with a helical groove 5004 of a lead screw 5005 rotated by the forward or backward rotation of a drive motor 5013 through drive force transmission gears 5011 and 5009 has a pin (not shown) and it is reciprocally driven in the directions of arrows a and b. An ink jet cartridge IJC is mounted on the carriage HC. Numeral 5002 denotes a sheet retainer plate which presses a sheet to a platen 5000 over the range of movement of the carriage. Numerals 5007 and 5008 denotes photo-couplers which serves as home position detection means for detecting the presence of a lever 5006 of the carriage in the range to switch the direction of rotation of a motor 5013. Numeral 5016 denote a member for supporting a capping member 5022 which caps the entire surface of a recording head, and numeral 5015 denotes suction means for sucking the interior of the cap and it suction-recovers the recording head through an aperture 5023 in the cap. Numeral 5017 denotes a cleaning blade which is movable back and forth by a member 5019. Numeral 5018 denotes a main unit support plate which supports 5017 and 5019. Numeral 5012 denotes a lever for starting the suction of the suction recovery, and it is moved with the movement of a cam 5020 which is engaged with the carriage so that a drive force from the drive motor is controlled by known transmission means such as a clutch.

The capping, cleaning and suction recovery are conducted at the corresponding positions by the action of the lead screw 5005 when the carriage is brought to the home position. It may conduct desired operations at a desired timing.

Figure 3:
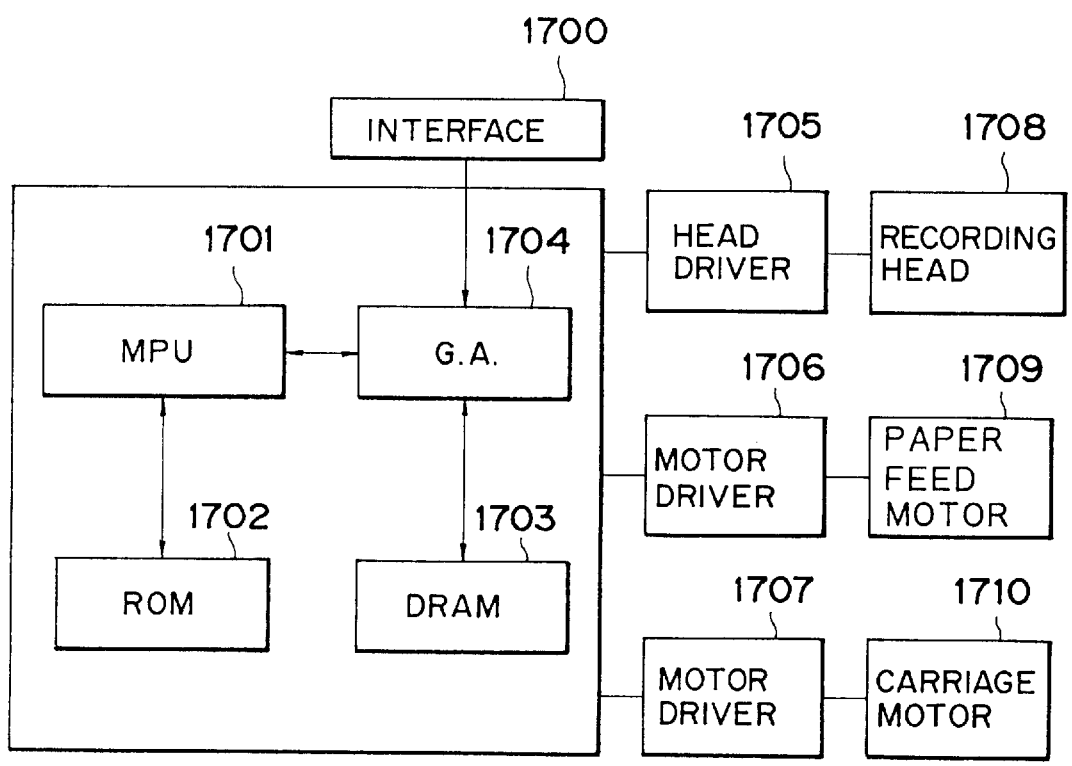
FIG. 3 shows a block diagram of a control unit of the second recording apparatus shown in FIG. 2.

FIG. 3 shows a block diagram of a control unit of the second recording apparatus shown in FIG. 2.

In FIG. 3, numeral 1700 denotes an interface to which a record signal is applied, numeral 1701 denotes an MPU, numeral 1702 denotes a program ROM for storing a control program to be executed by the MPU 1701, and numeral 1703 denotes a DRAM which stores various data (including the record signal record data to be supplied to a head). Numeral 1704 denotes a gate array for controlling the supply of the record data to a recording head 1708, and it also controls the transfer of data among the interface 1700, the MPU 1701 and the DRAM 1703. Numeral 1710 denotes a carrier motor for carrying the recording head 1708, numeral 1709 denotes a transport motor for transporting a record sheet, numeral 1705 denotes a head driver for driving the recording head, numeral 1706 denotes a motor driver for driving the transport motor 1709, and numeral 1707 denotes a motor driver for driving the carrier motor 1710.

In the recording apparatus constructed as described above, when a record signal is applied from the host computer 100 to be described later through the interface 1700, the record signal is converted to print record data by the gate array 1704 and the MPU 1701. The motor drivers 1706 and 1707 are driven and the recording head is driven in accordance with the record data sent to the head driver 1705 to print it out.

Figure 4:
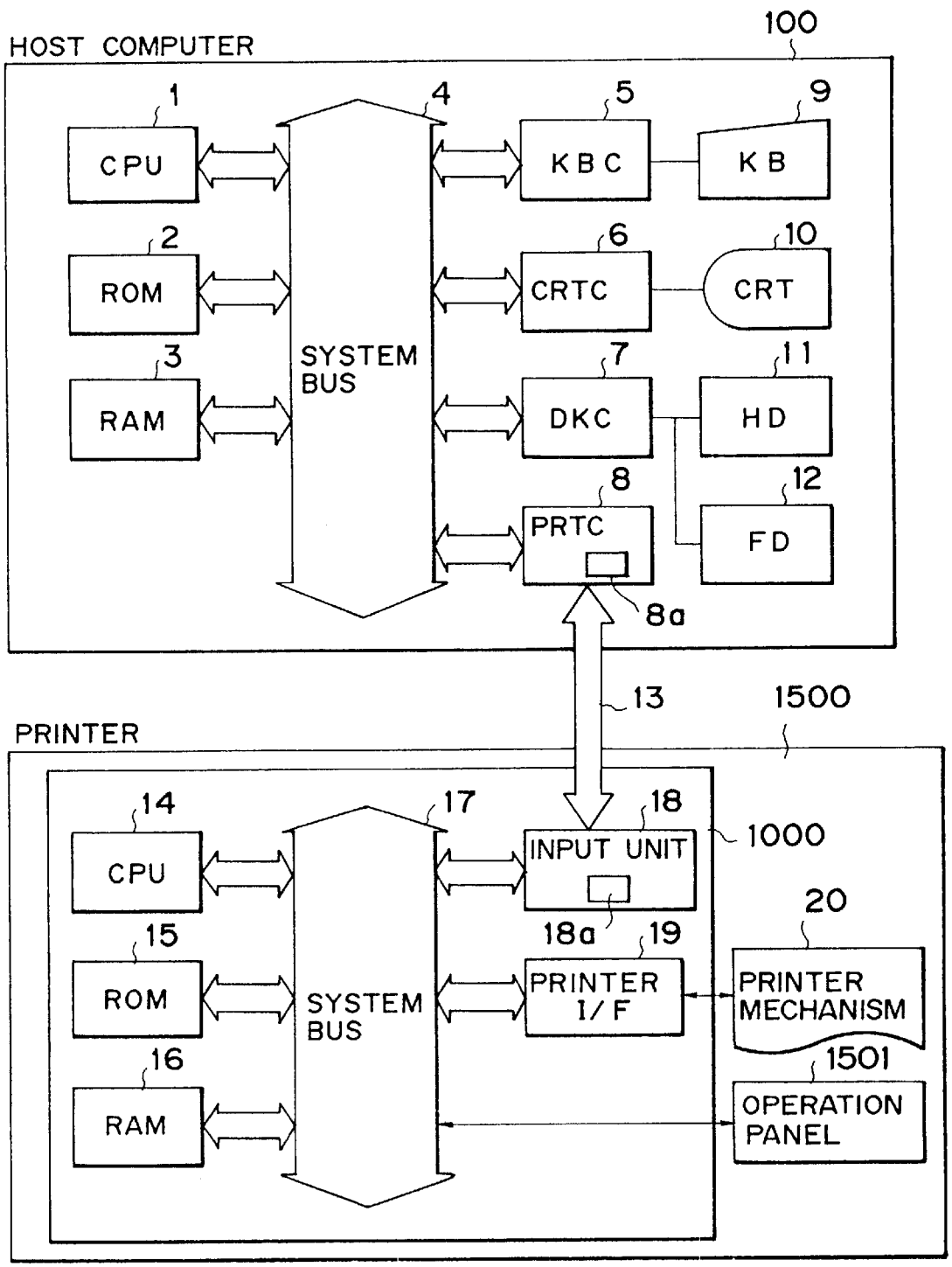
FIG. 4 shows a block diagram of a printer control system in one embodiment of the present invention.

FIG. 4 shows a block diagram of a configuration of a printer control system in one embodiment of the present invention. A laser beam printer (see FIG. 1) is used in the present embodiment.

The present invention may be applied to any system in which process is made through a network such as a LAN, whether it is a single unit system or a multi-unit system.

In FIG. 4, numeral 100 denotes a host computer which has a CPU 1 for processing a document having mixture of graphics, images, characters and tables (including spread sheets) in accordance with a document processing program stored in a ROM 2, and the CPU 1 centrally controls devices connected to a system bus 4.

Figure 6:
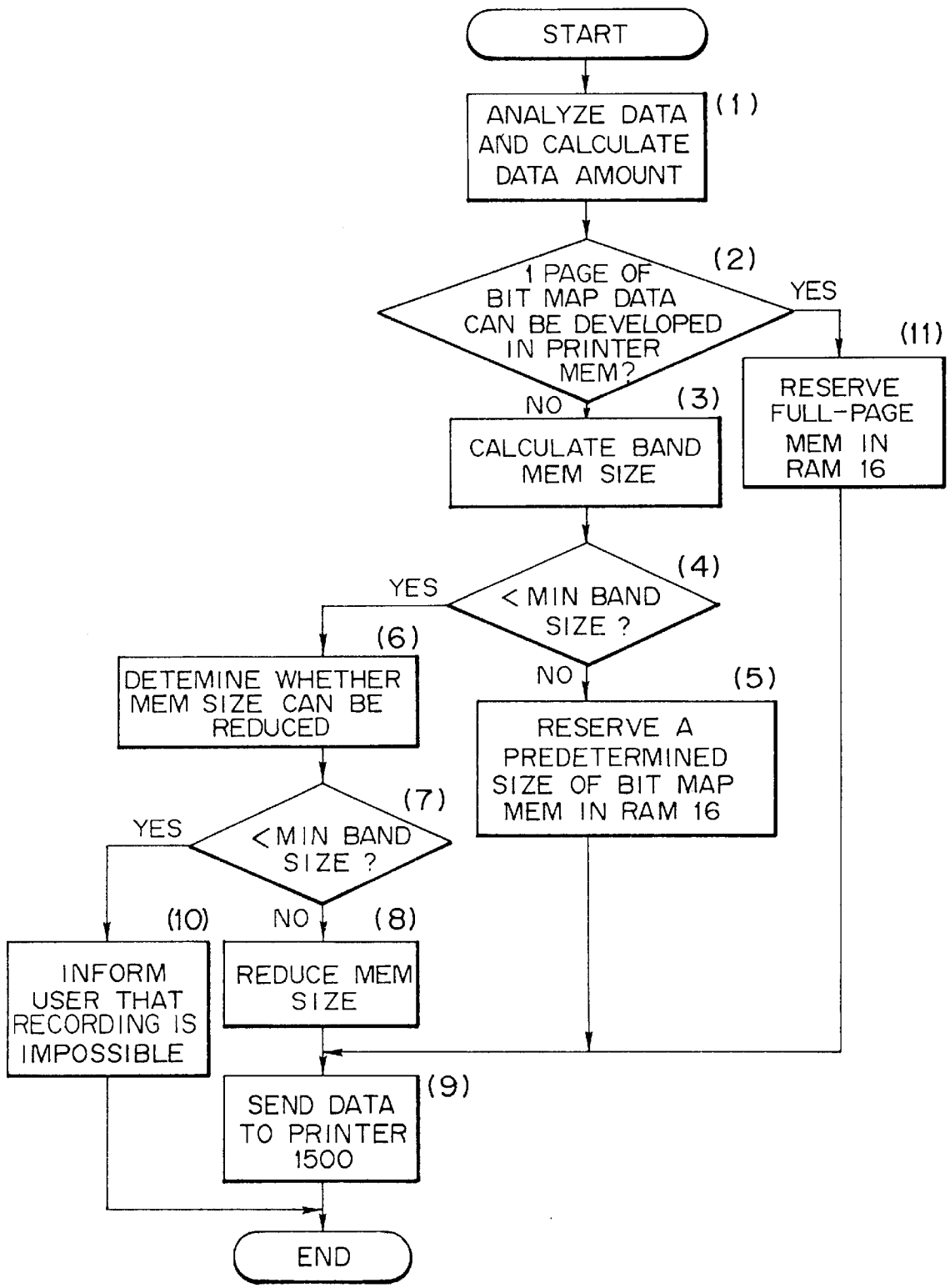
FIG. 6 shows a flow chart of a mapping process of a print memory by the host computer shown in FIG. 4.
Figure 7:
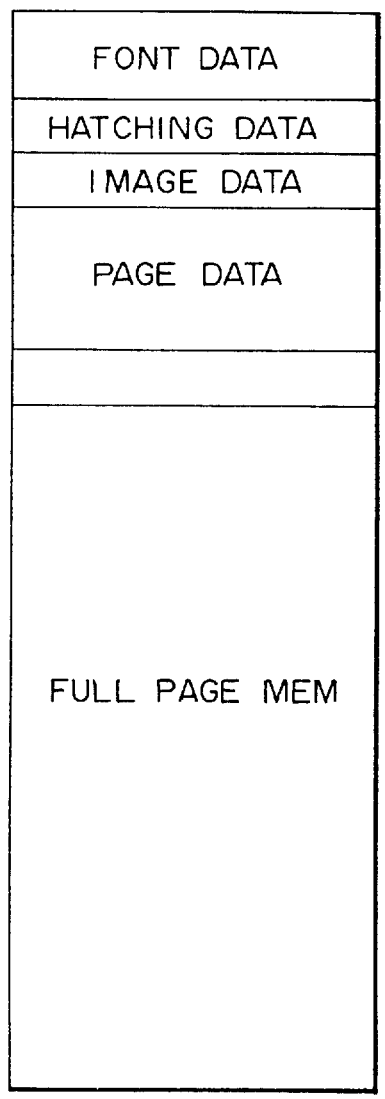
FIG. 7 shows a diagram of a memory map of a print memory of a printer of the present invention.

A control program for the CPU 1 shown in flow charts of FIGS. 6 and 7 is stored in the ROM 2. Numeral 3 denotes a RAM which functions as a main memory and a work area of the CPU 1. Numeral 5 denotes a keyboard controller (KBC) which controls the key entry from a keyboard 9. Numeral 6 denotes a CRT controller (CRTC) which controls the display of a CRT display (CRT) 10. Numeral 7 denotes a disk controller (DKC) which controls the access of a hard disk (HD) 11 which stores a boot program, various application programs, font data, a user file and an edit file, and a floppy disk (FD) 12. Numeral 8 denotes a printer controller (PRTC) which is connected to the printer 1500 through an interface 13 to control the communication with the printer 1500.

The CPU 1 may develop (rasterize) an outline font to a display information RAM set on the RAM 3 to permit the WYSIWYG processing on the CRT 10. Further, the CPU 1 may open various registered windows in accordance with a command indicated by a mouse cursor, not shown, to process various data. The document processing program may be stored in the hard disk 11 or the floppy disk 12 and loaded to the RAM 3 through the DKC 7 for execution.

In the printer 1500, numeral 14 denotes a CPU which centrally controls the access to various devices connected to a system bus 17 in accordance with a control program stored in a ROM 15 and outputs an image signal as print data to a print unit (printer engine) 20 connected through a printer interface 19.

Numeral 16 denoted a RAM which is uses as a work area of the CPU 14 and a storage for record information. The RAM 16 may be constructed to be expanded in the memory capacity by an optional RAM connected to an expansion port, not shown.

The printer interface 19 converts the print data to a format compatible to the mechanism of the print unit 20 and outputs it. It may convert parallel data to serial data. The printer interface 19 is provided with separate connectors so that it is compatible to a plurality of interfaces (SCSI interface, Centronics interface).

At least one card slot, not shown, may be provided to permit the connection of a build-in font as well as an optional card and a card containing a program for interpreting a different printer control language (an emulation card). An NVRAM which stores printer mode setting information from a console unit, not shown, may be provided.

In the recording system of the present embodiment, the CPU 1 compares the capacity data of the memory of the printer and the capacity of the data of the print job to be sent to determine the size of the band memory to be structured on the printer memory, and the CPU 14 acquires the determined size data of the band memory to dynamically set the band memory of the determined size on the printer memory. Accordingly, even if the band memory capacity is tight by the storage of other record information because of the fixed capacity of the printer memory, the optimum band memory to the data of the print job to be sent from the host computer is effectively secured.

A flow of a print job process of the recording system of the present invention is now explained with reference to FIGS. 5 and 6.

Figure 5:
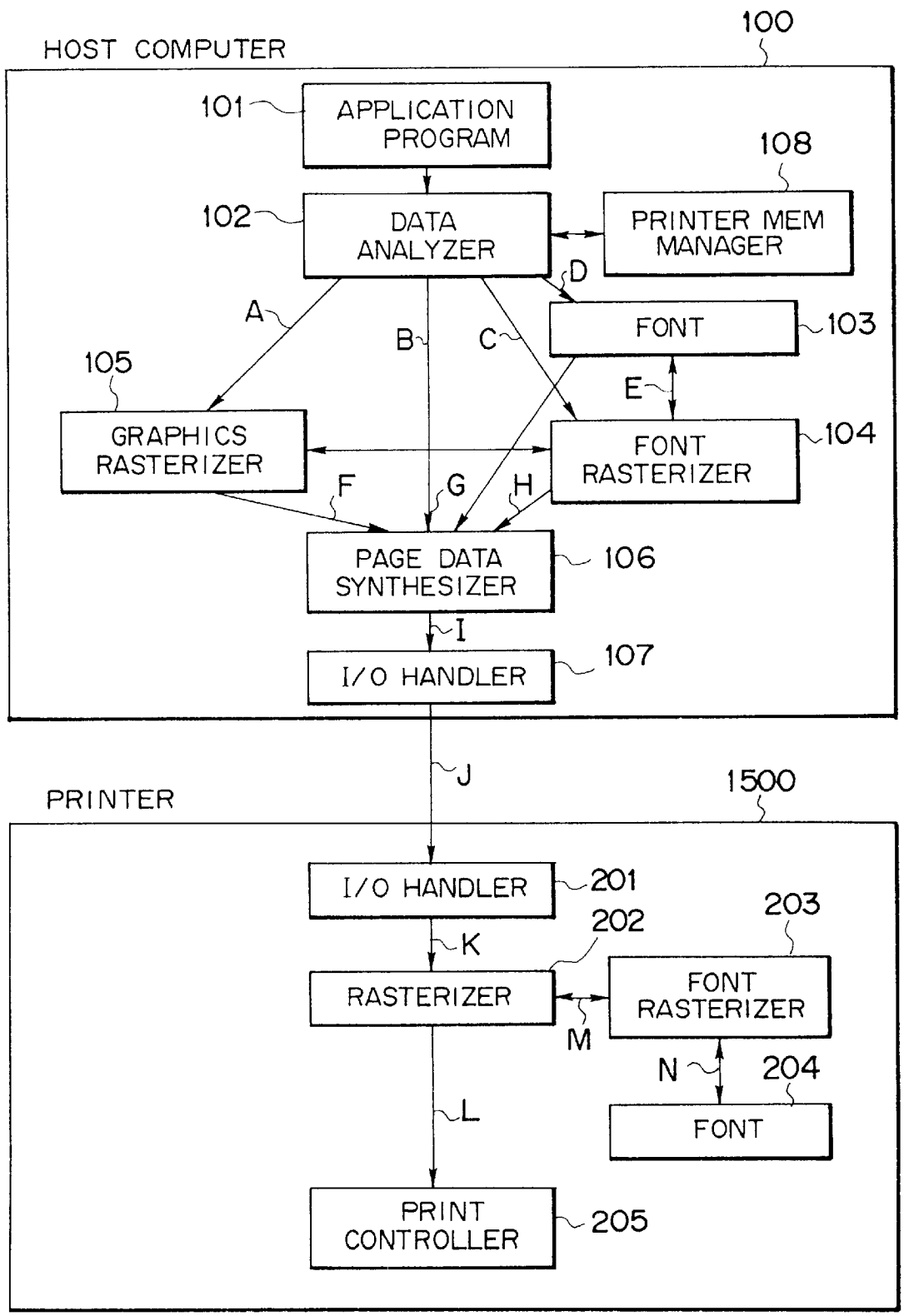
FIG. 5 shows a diagram of a data processing path between a printer and a host computer shown in FIG. 4.

FIG. 5 shows a diagram of a data process path between the printer 1500 and the host computer 100 shown in FIG. 4.

In FIG. 5, numeral 101 denotes an application being executed, which may be a DTP processing program. Numeral 103 denotes a data analyzer which analyzes and classifies content of a print job for each page or each job, calculates memory capacities for the font data, the hatching data, the image data and the page data, and delivers the results to the printer memory controller 108, which acquires the memory capacity of the printer memory by the inquiry to the definition file stored in the host computer or the printer, and determined the allocation of the printer memory (the memory map such as the processing band size and the size of font registration area) based on the printer memory size and the memory sizes of the respective data calculated by the data analyzer, and sends the determined allocation back to the data analyzer 102. The data analyzer 102 issues a command to set the determined allocation of the printer memory to a page generator 106 and directs the process data to the font 103, the font scaler (which functions as the first rasterizer) 104, the graphics rasterizer (which functions as the first rasterizer) 105, and the page data generator 106 in accordance with the determined allocation. The page data generator 106 combines the output data from the data analyzer 102, the graphics rasterizer 105, the font 103, the font scaler 104 and the graphics rasterizer 105 and delivers the combined page data to the input/output handler 107.

Numerals 107 and 201 denote input/output handlers which control the input/output of the printer 1500 and the host computer 100. Numeral 202 denotes a rasterizer which develops the rasterized data to a bit map. Numeral 203 denotes a rasterizer which rasterizes a font by referring a memory 204 which stores the outline data by referring the received outline font or based on the received character codes. Numeral 205 denotes a print control unit which controls the transfer of the bit map data outputted from the rasterizer 202 to the print unit 20 (see FIG. 4). A-N denote data process paths.

As shown in FIG. 5, where it is determined by the print job by the data analyzer 102 that there are rasterizer 202 and font rasterizer 203 in the printer 1500, the rasterization of the font may be distributed in accordance with the performances of the host computer 100 and the printer 1500, and one font may be processed by the rasterization by the host computer 100 and transferred to the printer 1500 (paths C-H-J-K) in the form of bit map and the remaining fonts may be transferred (paths D-G-J-K) to the printer 1500 in the form of outline for the rasterization by the font rasterizer 203. Further, the printer 1500 allocates the memory on the RAM 16 of FIG. 4 in accordance with the command from the data analyzer 102 to process the print data sent from the host computer 100. For example, it sets a smaller band size for a page having many bit map data of font or the bit image data to be down-loaded to the printer 1500.

On the other hand, when there is a band which may cause a smaller memory size of the printer when the bit map is developed in the host computer 100 rather than registering the font and the hatching pattern to the printer, that band is bit map-developed in the host computer 100 so that a larger band size can be secured accordingly.

On the other hand, where a full bit map memory can be secured in the printer 1500, the band size of the printer is set to one page. Thus, the printer memory can be effectively utilized in accordance with the print job and more complex print job can be processed with a smaller printer memory.

A method for controlling the printer of the present invention is now explained with reference to FIGS. 6 to 8B.

FIG. 6 shows a flow chart of a mapping process of the print memory by the host computer 100. Numerals (1)–(11) denote steps.

The CPU 1 first analyzes the print job (the capacity of the page data, the capacity of the font to be down-loaded, and the capacity of the hatching pattern) to calculate the capacity of the data to be sent to the printer 1500 (1). Then, it compares the acquired total capacity of the memory of the printer 1500 (which corresponds to the RAM 16 in the present embodiment) with the capacity of the data to be sent to determine whether one page of bit map can be developed in the printer memory as shown in FIG. 7 (2). If the decision is YES, the CPU 1 indicates the band (command) to secure a full page of bit map memory on the RAM 16 to the CPU 14 (11), and the process proceeds to a step (9).

Figure 8A:
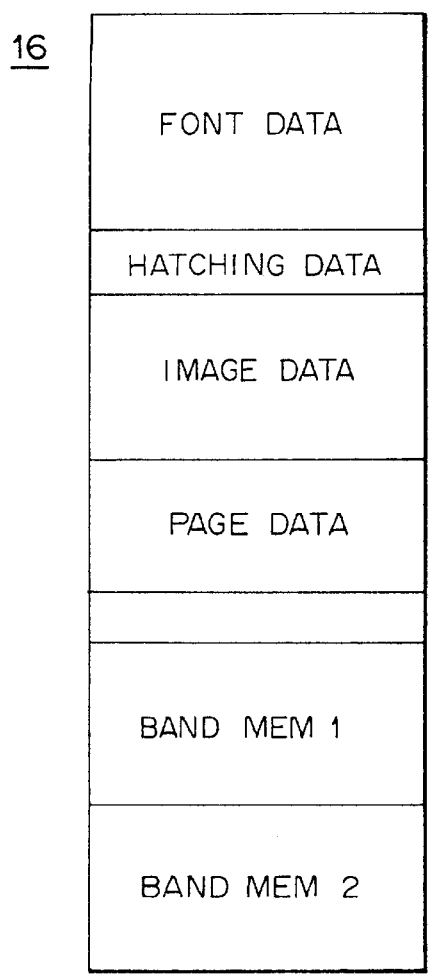
FIGS. 8A and 8B show diagrams of a memory map of the print memory of the printer of the present invention.
Figure 8B:
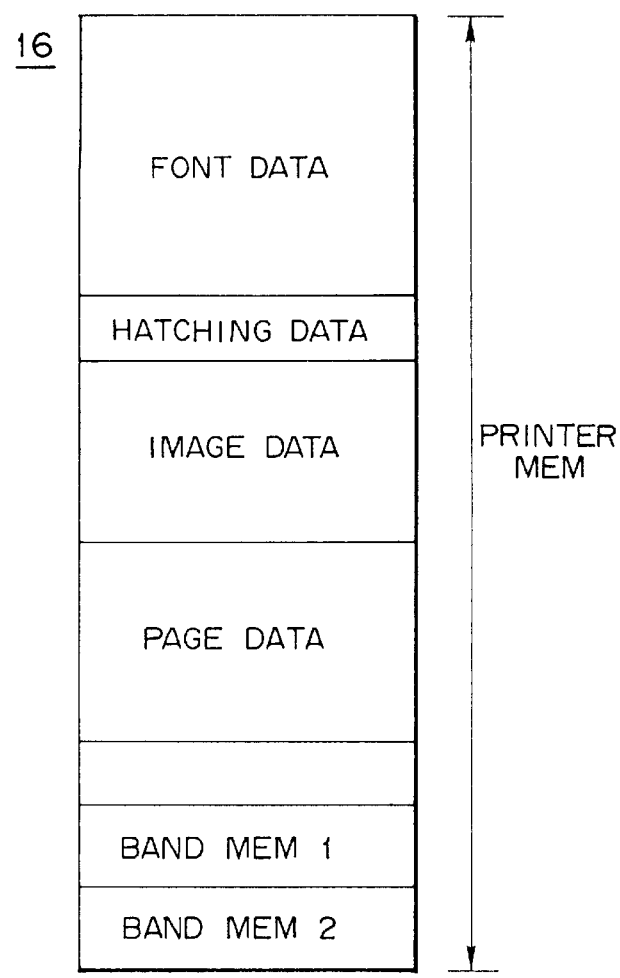

On the other hand, if the decision in the step (2) is NO, the CPU 1 calculates a band memory size to be secured on the RAM 16 (3), and determines if it is smaller than a band size to secure the band size (4). If the decision is NO, the CPU 1 indicates the band (command) to the CPU 14 to secure the bit map memory of the predetermined size on the RAM 16 of the printer 1500 as shown in FIG. 8A or FIG. 8B (5), and the process proceeds to the step (9). FIG. 8A shows the band memory designation when the data to be registered is in a small amount, and FIG. 8B shows the band memory designation when the data to be registered is in a large amount.

On the other hand, if the decision in the step (4) is YES, the possibility of the compaction of the memory is evaluated (6), that is, when the font data and the image are to be printed in overlap, the host computer 100 previously process the font as the image data to reduce the amount of font data to be sent and determines if the allocatable band size is smaller than the minimum band size or not (7). If the decision is NO (that is, the band memory can be secured), the compaction of the memory is executed (in the present embodiment, the compaction is made by reading the font data into the image data) as shown in FIG. 9 (8), and the record data to execute the print job is sent to the printer 1500 (9), and the process is terminated.

On the other hand, if the decision in the step (7) is YES, the disability of the recording process is informed to a user through the CRT 10, for example (10), and the expansion of the printer memory is requested. Then, the process is terminated.

Figure 9:
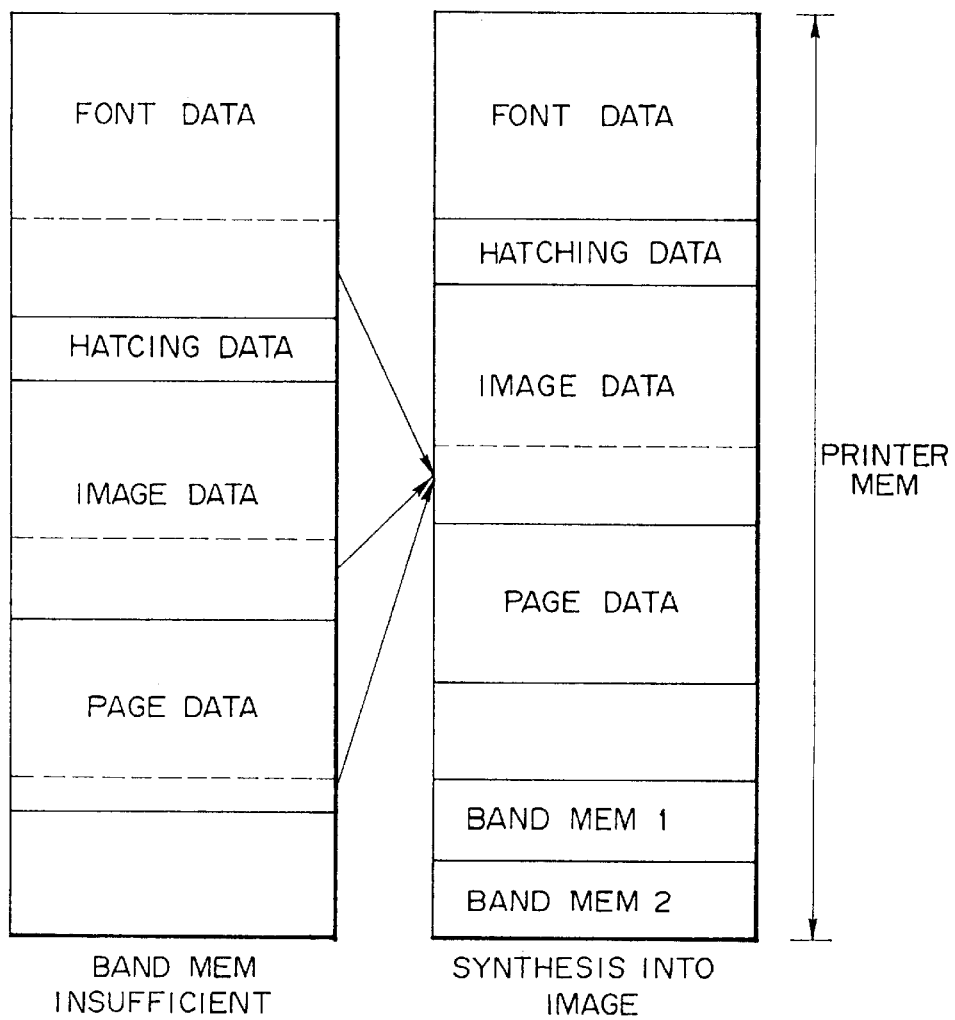
FIG. 9 shows a diagram of a memory map of the print memory of the printer of the present invention.

In this manner, the memory map of the printer memory is dynamically switched such that when there is a band which causes a smaller printer memory if the bit map is developed in the host computer 100 rather than registering the font and the hatching pattern to the printer, that band is bit map-developed in the host computer 100 so that a larger band size can be secured accordingly (see FIG. 9).

As described above, the print memory capacity data of the printer 1500 connected to the host computer 100 is acquired, the memory capacity data and the capacity of the data of the print job to be sent are compared, and memory map of the printer memory is determined while the band memory size on the printer memory is varied for each print job based on the comparison result so that the band memories of different sizes are dynamically secured on the printer memory of the printer in accordance with the determined memory map.

On the other hand, where a full bit map memory can be secured in the printer 1500, the band size of the printer is set to one page (see FIG. 7).

As a result, the efficient use of the printer memory in accordance with the print job is attained and a more complex print job can be processed with a smaller printer memory.

Figure 10:
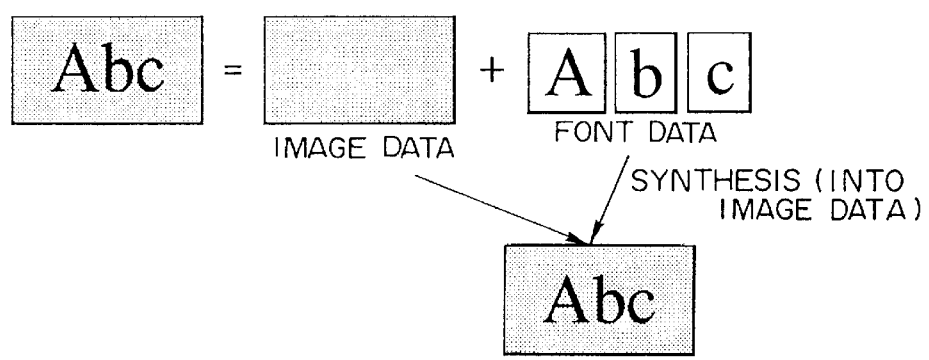
FIG. 10 shows a diagram of compaction of data to be sent to the printer of the present invention.

When the compaction of the memory to be used or required, if the band memory is smaller than the minimum band size as shown in FIG. 9, the font data is combined with the image to reduce the amount of font data. For example, as shown in FIG. 10, when the font data is to be overlapped on the image data (hatching pattern), the font data is combined with the image data to reduce the amount of font data to be sent to the printer 1500 so that the band memory of the at least minimum band size is secured on the RAM 16.

In the present embodiment, when the amount of data to be sent to calculated, a condition of the resolution power may be added to set the band size so that a bit map memory of the optimum band size to the resolution power can be secured.

In the present embodiment, when the band size is to be secured, the compaction at a fixed ratio is made, although the band size may be compacted at any desired ratio.

What is claimed is:

1. An information processing apparatus which outputs data to a printer, having a memory, connected to said apparatus through a bi-directional interface, said apparatus comprising:

acquiring means for acquiring a memory capacity, of the memory of the printer, available for a printing process;

comparing means for comparing the memory capacity acquired by said acquiring means with a capacity of data to be outputted to the printer;

determination means for determining a memory size, of the memory of the printer, required to execute a drawing process based on the data from said apparatus, in accordance with a comparison result made by said comparing means; and instruction means for instructing the printer to reserve a memory space having the memory size determined by said determination means.

2. An information processing apparatus according to claim 1, wherein said determination means determines the size of the memory of the printer for each predetermined amount of data to be outputted.

3. An information processing apparatus according to claim 1, further comprising informing means for, when said determination means cannot determine the memory size, outputting an external notification to such effect.

4. An information processing apparatus according to claim 1, further comprising analysis means for analyzing the data to be outputted to the printer to calculate the amount of data.

5. An information processing apparatus according to claim 1, further comprising transfer means transferring information indicating the memory size determined by said determination means to the printer.

6. An information processing apparatus according to claim 1, wherein said information processing apparatus comprises a host computer.

7. An output apparatus comprising:

memory means;

receiving means for receiving, from an information processing apparatus connected to said output apparatus through a bi-directional interface, memory size information determined based on a capacity of data outputted from the information processing apparatus through the bi-directional interface and a capacity of said memory means available for a printing process; and reserving means for reserving a memory space of said memory means required to execute a drawing process based on the data outputted from the information processing apparatus, in accordance with the memory size information received by said receiving means.

8. An output apparatus according to claim 7, wherein the memory size information comprises a command outputted from the information processing apparatus.

9. An output apparatus according to claim 7, wherein the information processing apparatus comprises a host computer.

10. An output apparatus according to claim 7, wherein said output apparatus comprises a printer.

11. An information processing apparatus according to claim 1, wherein said determination means determines the memory size to be one page.

12. An information processing apparatus according to claim 1, wherein said determination means determines the memory size to be one line.

13. An output apparatus according to claim 7, wherein said reserving means reserves a memory space having a size sufficient to store one page of data.

14. An output apparatus according to claim 7, wherein said reserving means reserves a memory space having a size sufficient to store one band of data.

15. An information processing apparatus which outputs data to an external apparatus, having a memory, connected to said information processing apparatus through a bi-directional interface, said information processing apparatus comprising:
   acquiring means for acquiring a memory capacity, of the memory of the external apparatus, available for a printing process;
   determination means for determining a memory size of the memory of the external apparatus based on the memory capacity acquired by said acquiring means and a capacity of data to be outputted to the external apparatus, the memory size being required to execute a drawing process based on the data to be outputted to the external apparatus; and
   instruction means for instructing the external apparatus to reserve a memory space having the memory size determined by said determination means.

16. An information processing apparatus according to claim 15, wherein said determination means determines the size of the memory of the external apparatus for each predetermined amount of data to be outputted.

17. An information processing apparatus according to claim 15, further comprising informing means for, when said determination means cannot determine the memory size, informing outside of said information processing apparatus to such effect.

18. An information processing apparatus according to claim 15, further comprising analysis means for analyzing data to be outputted to the external apparatus to calculate the amount of data.

19. An information processing apparatus according to claim 15, further comprising transfer means for transferring information indicating the memory size determined by said determination means to the external apparatus.

20. An information processing apparatus according to claim 15, wherein said information processing apparatus comprises a host computer.

21. An information processing apparatus according to claim 15, wherein the external apparatus is a printer.

22. An information processing apparatus according to claim 15, wherein said determination means determines the memory size to be one page.

23. An information processing apparatus according to claim 15, wherein said determination means determines the memory size to be one line.

24. An output apparatus comprising:
   memory means;
   receiving means for receiving, from an external apparatus connected to said output apparatus through a bi-directional interface, memory size information determined based on a capacity of data outputted from the external apparatus and a capacity of said memory means available for a printing process; and
   reserving means for reserving a memory space, of said memory means, required to execute a drawing process based on the data outputted from the external apparatus in accordance with the memory size information received by said receiving means.

25. An information processing apparatus according to claim 24, wherein the memory size information comprises a command outputted from the external apparatus.

26. An information processing apparatus according to claim 24, wherein the external apparatus is a host computer.

27. An information processing apparatus according to claim 24, wherein said information processing apparatus comprises a printer.

28. An information processing apparatus according to claim 24, wherein said reserving means reserves a memory space having a size sufficient to store one page of data.

29. An information processing apparatus according to claim 24, wherein said reserving means reserves a memory space having a size sufficient to store one band of data.

30. A method of operating an information processing apparatus which outputs data to a printer, having a memory, connected to the apparatus through a bi-directional interface, said method comprising the steps of:
   acquiring a memory capacity, of the memory of the printer, available for a printing process;
   comparing the memory capacity acquired in said acquiring step with a capacity of data to be outputted to the printer;
   determining a memory sizes, of the memory of the printer, required to execute a drawing process based on the data from the apparatus, in accordance with a comparison result of said comparing step; and
   instructing the printer to reserve a memory space having the memory size determined in said determining step.

31. A method according to claim 30, wherein said determination step determines the size of the memory of the printer for each predetermined amount of data to be outputted.

32. A method according to claim 30, further comprising, when said determination step cannot determine the memory size, outputting an external notification to such effect.

33. A method according to claim 30, further comprising analyzing the data to be outputted to the printer to calculate the amount of data.

34. A method according to claim 30, further comprising transferring information indicating the memory size determined by said determination step to the printer.

35. A method according to claim 30, wherein said information processing apparatus comprises a host computer.

36. A method according to claim 30, wherein said determination step determines the memory size to be one page.

37. A method according to claim 30, wherein said determination step determines the memory size to be one line.

38. A method of operating an output apparatus having a memory, comprising the steps of:
   receiving, from an information processing apparatus connected to said output apparatus through a bi-directional interface, memory size information determined based on a capacity of data outputted from the information processing apparatus through the bi-directional interface and a capacity of the memory available for a printing process; and
   reserving a memory space, of the memory, required to execute a drawing process based on the data outputted from the information processing apparatus in accordance with the memory size information received by said receiving step.

39. A method according to claim 38, wherein the memory size information comprises a command outputted from the information processing apparatus.

40. A method according to claim 38, wherein the information processing apparatus comprises a host computer.

41. A method according to claim 38, wherein said output apparatus comprises a printer.

42. A method according to claim 38, wherein said reserving step reserves a memory space having a size sufficient to store one page of data.

43. A method according to claim 38, wherein said reserving step reserves a memory space having a size sufficient to store one band of data.

44. A method of operating an information processing apparatus which outputs data to an external apparatus, having a memory, connected to said information processing apparatus through a bi-directional interface, comprising the steps of:

acquiring a memory capacity, of the memory of the external apparatus, available for a printing process;

determining a memory size of the memory of the external apparatus based on the memory capacity acquired in said acquiring step and a capacity of data to be outputted to the external apparatus, the memory size being required to execute a drawing process based on the data to be outputted to the external apparatus; and instructing the external apparatus to reserve a memory space having the memory size determined in said determining step.

45. A method according to claim 44, wherein said determination step determines the size of the memory of the external apparatus for each predetermined amount of data to be outputted.

46. A method according to claim 44, further comprising, when said determination step cannot determine the memory size, informing outside of said information processing apparatus to such effect.

47. A method according to claim 44, further comprising analyzing the data to be outputted to the external apparatus to calculate the amount of data.

48. A method according to claim 44, further comprising transferring information indicating the memory size determined by said determination step to the external apparatus.

49. A method according to claim 44, wherein said information processing apparatus comprises a host computer.

50. A method according to claim 44, wherein the external apparatus is a printer.

51. A method according to claim 44, wherein said determination step determines the memory size to be one page.

52. A method according to claim 44, wherein said determination step determines the memory size to be one line.

53. A method of operating an output apparatus having a memory, comprising the steps of:

receiving, from an external apparatus connected to the output apparatus through a bi-directional interface, memory size information determined based on a capacity of data outputted from the external apparatus and a capacity of the memory available for a printing process; and reserving a memory space, of the memory, required to execute a drawing process based on the data outputted from the external apparatus, in accordance with the memory size information received in said receiving step.

54. A method according to claim 53, wherein the memory size information comprises a command outputted from the external apparatus.

55. A method according to claim 53, wherein the external apparatus is a host computer.

56. A method according to claim 53, wherein said information processing apparatus comprises a printer.

57. A method according to claim 53, wherein said reserving step reserves a memory space having a size sufficient to store one page of data.

58. An information processing apparatus according to claim 53, wherein said reserving step reserves a memory space having a size sufficient to store one band of data.

59. An information processing system comprising an information processing apparatus and an output apparatus, having memory means, connected to said information processing apparatus through a bi-directional interface, said information processing apparatus comprising:

acquiring means for acquiring a memory capacity, of said memory means, available for a printing process;

comparing means for comparing the memory capacity acquired by said acquiring means with a capacity of data to be sent to said output apparatus;

determination means for determining a memory size, of said memory means, required to execute a drawing process based on the data sent from said information processing apparatus, in accordance with a comparison result made by said comparing means; and instruction means for providing an instruction to said output apparatus which instructs said output apparatus to reserve a memory space having the memory size determined by said determination means, and said output apparatus comprising:

said memory means;

receiving means for receiving the instruction from said instruction means; and reserving means for reserving the memory space in said memory means in response to the instruction received by said receiving means.

60. An information processing system comprising an information processing apparatus and an external apparatus, having memory means, connected to said information processing apparatus through a bi-directional interface, said information processing apparatus comprising:

acquiring means for acquiring a memory capacity, of said memory means, available for a printing process;

determination means for determining a memory size of said memory means based on the memory capacity acquired by said acquiring means and a capacity of data to be sent to said external apparatus, the memory size being required to execute a drawing process based on the data to be sent to said external apparatus; and instruction means for providing an instruction to said external apparatus which instructs said external apparatus to reserve a memory space having the memory size determined by said determination means, and said external apparatus comprising:

said memory means;

receiving means for receiving the instruction from said instruction means; and reserving means for reserving the memory space in said memory means in response to the instruction received by said receiving means.

61. A memory medium storing program instructions to cause a programmed apparatus to execute a method of operating an information processing apparatus which outputs data to a printer, having a memory, connected to the information processing apparatus through a bi-directional interface, said instructions comprising at least the steps of:

an acquiring step to acquire a memory capacity, of the memory of the printer, available for a printing process;

a comparing step to compare the memory acquired in said acquiring step with a capacity of data to be outputted to the printer;

a determining step to determine a memory size, of the memory of the printer, required to execute a drawing process based on the data from the information processing apparatus, in accordance with a comparison result in said comparing step; and an instructing step to instruct the printer to reserve a memory space having the memory size determined in said determining step.

62. A memory medium storing program instructions to cause a programmed apparatus to execute a method of operating an information processing apparatus which outputs data to an external apparatus, having a memory, connected to the information processing apparatus through a bi-directional interface, said instruction method comprising at least the steps of:

an acquiring step to acquire a memory capacity, of the memory of the external apparatus, available for a printing process;

a determining step to determine a memory size of the memory of the external apparatus based on the memory capacity acquired in said acquiring step and a capacity of data to be outputted to the external apparatus, the memory size being required to execute a drawing process based on the data to be outputted to the external apparatus; and an instructing step to instruct the external apparatus to reserve a memory space having the memory size determined in said determining step.

63. A memory medium storing program instructions to cause a programmed apparatus to execute a method of operating an information processing system comprising an information processing apparatus and an output apparatus, having a memory, connected to the information processing apparatus through a bi-directional interface, said instructions comprising at least the steps of:

an acquiring step to acquire a memory capacity, of the memory, available for a printing process, in the information processing apparatus;

a comparing step to compare the memory capacity acquired in said acquiring step with a capacity of data to be sent to the output apparatus, in the information processing apparatus;

a determining step to determine a memory size, of the memory, required to execute a drawing process based on the data sent from the information processing apparatus, in accordance with a comparison result made in said comparing step, in the information processing apparatus;

a providing step to provide an instruction to the output apparatus which instructs the output apparatus to reserve a memory space having the memory size determined in said determining step, in the information processing apparatus;

a receiving step to receive the instruction provided in said providing step, in the output apparatus; and a reserving step to reserve the memory space in the memory in response to the instruction received in said receiving step, in the output apparatus.

64. A memory medium storing program instructions to cause a programmed apparatus to execute a method of operation of an information processing system comprising an information processing apparatus and an external apparatus, having a memory, connected to the information processing apparatus through a bi-directional interface, said instructions comprising at least the steps of:

an acquiring step to acquire a memory capacity, of the memory, available for a printing process, in the information processing apparatus;

a determining step to determine a memory size of the memory based on the memory capacity acquired in said acquiring step and a capacity of data to be sent to the external apparatus, the memory size being required to execute a drawing process based on the data to be sent to the external apparatus, in the information processing apparatus;

a providing step to provide an instruction to the external apparatus which instructs the external apparatus to reserve a memory space having the memory size determined in said determining step, in the information processing apparatus;

a receiving step to receive the instruction provided in said providing step, in the external apparatus; and a reserving step to reserve the memory space in the memory in response to the instruction received in said receiving step.

65. An information processing apparatus which outputs data to an external apparatus, having a memory, connected to said information processing apparatus through a bi-directional interface, said information processing apparatus comprising:

acquiring means for acquiring a memory capacity memory of the external apparatus available for a printing process;

judgment means for judging whether output data to be outputted to the external apparatus can be printed in the external apparatus, based on the output data and the memory capacity acquired by said acquiring means; and informing means for providing a notification that the output data cannot be printed, when said judgment means judges that the output data cannot be printed.

66. An information processing apparatus according to claim 65, wherein said judgment means judges whether the output data can be developed into one page of bit map data in the memory of the external apparatus.

67. An information processing apparatus according to claim 65, wherein after judging that the output data cannot be printed in the external apparatus, sa id judgment means judges whether the output data can be printed in band control.

68. An information processing apparatus according to claim 66, wherein after judging that the output data cannot be developed into one page of bit map data in the memory of the external apparatus, said judgment means judges whether the output data can be printed in band control.

69. An information processing apparatus according to claim 65, wherein after judging that the output data cannot be printed in the external apparatus, said judgment means judges whether the output data as reduced in amount can be printed in the external apparatus.

70. An information processing apparatus according to claim 66, wherein after judging that the output data cannot be developed into one page of bit map data in the memory of the external apparatus, said judgment means judges whether the output data as reduced in amount can be printed in the external apparatus.

71. An information processing apparatus according to claim 67, wherein after judging that the output data cannot be printed in band control, said judgment means judges whether the output data as reduced in amount can be printed in the external apparatus.

72. An information processing apparatus according to claim 68, wherein after judging that the output data cannot be printed in band control, said judgment means judges whether the output data as reduced in amount can be printed in the external apparatus.

73. An information processing apparatus according to claim 65, wherein after judging that the output data cannot be printed in the external apparatus, said judgment means judges whether the output data as developed into bit map data in said information processing apparatus can be printed in the external apparatus.

74. An information processing apparatus according to claim 66, wherein after judging that the output data cannot be developed into one page of bit map data in the memory of the external apparatus, said judgment means judges whether the output data as developed into bit map data in said information processing apparatus can be printed in the external apparatus.

75. An information processing apparatus according to claim 67, wherein after judging that the output data cannot be printed in band control, said judgment means judges whether the output data as developed into bit map data in said information processing apparatus can be printed in the external apparatus.

76. An information processing apparatus according to claim 68, wherein after judging that the output data cannot be printed in band control, said judgment means judges whether the output data as developed into bit map data in said information processing apparatus can be printed in the external apparatus.

77. An information processing apparatus according to claim 69, wherein after judging that the output data as reduced in amount cannot be printed in the external apparatus, said judgment means judges whether the output data as developed into bit map data in said information processing apparatus can be printed in the external apparatus.

78. An information processing apparatus according to claim 70, wherein after judging that the output data as reduced in amount cannot be printed in the external apparatus, said judgment means judges whether the output data as developed into bit map data in said information processing apparatus can be printed in the external apparatus.

79. An information processing apparatus according to claim 71, wherein after judging that the output data as reduced in amount cannot be printed in the external apparatus, said judgment means judges whether the output data as developed into bit map data in said information processing apparatus can be printed in the external apparatus.

80. An information processing apparatus according to claim 72, wherein after judging that the output data as reduced in amount cannot be printed in the external apparatus, said judgment means judges whether the output data as developed into bit map data in said information processing apparatus can be printed in the external apparatus.

81. An information processing apparatus according to claim 65, further comprising determination means for determining a memory size of the memory of the external apparatus based on the memory capacity acquired by said acquiring means and a capacity of the output data, the memory size being required to execute a drawing process based on the output data.

82. An information processing apparatus according to claim 81, further comprising instruction means for instructing the external apparatus to reserve a memory space having the memory size determined by said determination means.

83. An information processing system comprising:
a printing apparatus for printing data, said printing apparatus having memory means; and
an information processing apparatus, connected to said printing apparatus through a bi-directional interface, for outputting data to said printing apparatus, said information processing apparatus comprising:
acquiring means for acquiring a memory capacity of said memory means available for a printing process;
judgment means for judging whether output data to be outputted to said printing apparatus can be printed in said printing apparatus, based on the output data and the memory capacity acquired by said acquiring means; and
informing means for providing a notification that the output data cannot be printed, when said judgment means judges that the output data cannot be printed.

84. An information processing system according to claim 83, wherein said judgment means judges whether the output data can be developed into one page of bit map data in said memory means.

85. An information processing system according to claim 83, wherein after judging that the output data cannot be printed in said printing apparatus, said judgment means judges whether the output data can be printed in band control.

86. An information processing system according to claim 84, wherein after judging that the output data cannot be developed into one page of bit map data in said memory means, said judgment means judges whether the output data can be printed in band control.

87. An information processing system according to claim 83, wherein after judging that the output data cannot be printed in said printing apparatus, said judgment means judges whether the output data as reduced in amount can be printed in said printing apparatus.

88. An information processing system according to claim 84, wherein after judging that the output data cannot be developed into one page of bit map data in said memory means, said judgment means judges whether the output data as reduced in amount can be printed in said printing apparatus.

89. An information processing system according to claim 85, wherein after judging that the output data cannot be printed in band control, said judgment means judges whether the output data as reduced in amount can be printed in said printing apparatus.

90. An information processing system according to claim 86, wherein after judging that the output data cannot be printed in band control, said judgment means judges whether the output data as reduced in amount can be printed in said printing apparatus.

91. An information processing system according to claim 83, wherein after judging that the output data cannot be printed in said printing apparatus, said judgment means judges whether the output data as developed into bit map data in said information processing apparatus can be printed in said printing apparatus.

92. An information processing system according to claim 84, wherein after judging that the output data cannot be developed into one page of bit map data in said memory means, said judgment means judges whether the output data as developed into bit map data in said information processing apparatus can be printed in said printing apparatus.

93. An information processing system according to claim 85, wherein after judging that the output data cannot be printed in band control, said judgment means judges whether the output data as developed into bit map data in said information processing apparatus can be printed in said printing apparatus.

94. An information processing system according to claim 86, wherein after judging that the output data cannot be printed in band control, said judgment means judges whether the output data as developed into bit map data in said information processing apparatus can be printed in said printing apparatus.

95. An information processing system according to claim 87, wherein after judging that the output data as reduced in amount cannot be printed in said printing apparatus, said judgment means judges whether the output data as developed into bit map data in said information processing apparatus can be printed in said printing apparatus.

96. An information processing system according to claim 88, wherein after judging that the output data as reduced in amount cannot be printed in said printing apparatus, said judgment means judges whether the output data as developed into bit map data in said information processing apparatus can be printed in said printing apparatus.

97. An information processing system according to claim 89, wherein after judging that the output data as reduced in amount cannot be printed in said printing apparatus, said judgment means judges whether the output data as developed into bit map data in said information processing apparatus can be printed in said printing apparatus.

98. An information processing system according to claim 90, wherein after judging that the output data as reduced in amount cannot be printed in said printing apparatus, said judgment means judges whether the output data as developed into bit map data in said information processing apparatus can be printed in said printing apparatus.

99. An information processing system according to claim 83, wherein said information processing apparatus further comprises determination means for determining a memory size of said memory means based on the memory capacity acquired by said acquiring means and a capacity of the output data, the memory size being required to execute a drawing process based on the output data.

100. An information processing system according to claim 99, further comprising instruction means for instructing the external apparatus to reserve a memory space having the memory size determined by said determination means.

101. A method for processing information in an information processing apparatus which outputs data to an external apparatus, having a memory, said external apparatus connected to said information processing apparatus through a bi-directional interface, said method comprising the steps of:

acquiring a memory capacity memory of the external apparatus available for a printing process;

judging whether output data to be outputted to the external apparatus can be printed in the external apparatus, based on the output data and the memory capacity acquired by in said acquiring step; and providing a notification that the output data cannot be printed, when said judgment means judges that the output data cannot be printed.

102. A method according to claim 101, wherein said judging step judges whether the output data can be developed into one page of bit map data in the memory of the external apparatus.

103. A method according to claim 101, wherein after judging that the output data cannot be printed in the external apparatus, said judging step judges whether the output data can be printed in band control.

104. A method according to claim 102, wherein after judging that the output data cannot be developed into one page of bit map data in the memory of the external apparatus, said judging step judges whether the output data can be printed in band control.

105. A method according to claim 102, wherein after judging that the output data cannot be printed in the external apparatus, said judging step judges whether the output data as reduced in amount can be printed in the external apparatus.

106. A method according to claim 102, wherein after judging that the output data cannot be developed into one page of bit map data in the memory of the external apparatus, said judging step judges whether the output data as reduced in amount can be printed in the external apparatus.

107. A method according to claim 103, wherein after judging that the output data cannot be printed in band control, said judging step judges whether the output data as reduced in amount can be printed in the external apparatus.

108. A method according to claim 104, wherein after judging that the output data cannot be printed in band control, said judging step judges whether the output data as reduced in amount can be printed in the external apparatus.

109. A method according to claim 105, wherein after judging that the output data cannot be printed in the external apparatus, said judging step judges whether the output data as developed into bit map data in said information processing apparatus can be printed in the external apparatus.

110. A method according to claim 102, wherein after judging that the output data cannot be developed into one page of bit map data in the memory of the external apparatus, said judging step judges whether the output data as developed into bit map data in said information processing apparatus can be printed in the external apparatus.

111. A method according to claim 103, wherein after judging that the output data cannot be printed in band control, said judging step judges whether the output data as developed into bit map data in said information processing apparatus can be printed in the external apparatus.

112. A method according to claim 104, wherein after judging that the output data cannot be printed in band control, said judging step judges whether the output data as developed into bit map data in said information processing apparatus can be printed in the external apparatus.

113. A method according to claim 105, wherein after judging that the output data as reduced in amount cannot be printed in the external apparatus, said judging step judges whether the output data as developed into bit map data in said information processing apparatus can be printed in the external apparatus.

114. A method according to claim 106, wherein after judging that the output data as reduced in amount cannot be printed in the external apparatus, said judging step judges whether the output data as developed into bit map data in said information processing apparatus can be printed in the external apparatus.

115. A method according to claim 107, wherein after judging that the output data as reduced in amount cannot be printed in the external apparatus, said judging step judges whether the output data as developed into bit map data in said information processing apparatus can be printed in the external apparatus.

116. A method according to claim 108, wherein after judging that the output data as reduced in amount cannot be printed in the external apparatus, said judging step judges whether the output data as developed into bit map data in said information processing apparatus can be printed in the external apparatus.

117. A method according to claim 101, further comprising the step of determining a memory size of the memory of the external apparatus based on the memory capacity acquired in said acquiring step and a capacity of the output data, the memory size being required to execute a drawing process based on the output data.

118. A method according to claim 117, further comprising instruction means for instructing the external apparatus to reserve a memory space having the memory size determined by said determination means.

119. A method for processing information in an information processing system comprised by a printing apparatus having a memory means and an information processing apparatus connected to the printing apparatus through a bi-directional interface, for outputting data to the printing apparatus, said method comprising the steps of:
  acquiring a memory capacity of said printing apparatus available for a printing process;
  judging whether output data to be outputted to said printing apparatus can be printed in said printing apparatus, based on the output data and the memory capacity acquired in said acquiring step; and
  providing a notification that the output data cannot be printed, when said judging step judges that the output data cannot be printed.

120. A method according to claim 119, wherein said judging step judges whether the output data can be developed into one page of bit map data in said memory means.

121. A method according to claim 119, wherein after judging that the output data cannot be printed in said printing apparatus, said judging step judges whether the output data can be printed in band control.

122. A method according to claim 120, wherein after judging that the output data cannot be developed into one page of bit map data in said memory means, said judging step judges whether the output data can be printed in band control.

123. A method according to claim 119, wherein after judging that the output data cannot be printed in said printing apparatus, said judging step judges whether the output data as reduced in amount can be printed in said printing apparatus.

124. A method according to claim 120, wherein after judging that the output data cannot be developed into one page of bit map data in said memory means, said judging step judges whether the output data as reduced in amount can be printed in said printing apparatus.

125. A method according to claim 121, wherein after judging that the output data cannot be printed in band control, said judging step judges whether the output data as reduced in amount can be printed in said printing apparatus.

126. A method according to claim 122, wherein after judging that the output data cannot be printed in band control, said judging step judges whether the output data as reduced in amount can be printed in said printing apparatus.

127. A method according to claim 119, wherein after judging that the output data cannot be printed in said printing apparatus, said judging step judges whether the output data as developed into bit map data in said information processing apparatus can be printed in said printing apparatus.

128. A method according to claim 120, wherein after judging that the output data cannot be developed into one page of bit map data in said memory means, said judging step judges whether the output data as developed into bit map data in said information processing apparatus can be printed in said printing apparatus.

129. A method according to claim 121, wherein after judging that the output data cannot be printed in band control, said judging step judges whether the output data as developed into bit map data in said information processing apparatus can be printed in said printing apparatus.

130. A method according to claim 122, wherein after judging that the output data cannot be printed in band control, said judging step judges whether the output data as developed into bit map data in said information processing apparatus can be printed in said printing apparatus.

131. A method according to claim 123, wherein after judging that the output data as reduced in amount cannot be printed in said printing apparatus, said judging step judges whether the output data as developed into bit map data in said information processing apparatus can be printed in said printing apparatus.

132. A method according to claim 124, wherein after judging that the output data as reduced in amount cannot be printed in said printing apparatus, said judging step judges whether the output data as developed into bit map data in said information processing apparatus can be printed in said printing apparatus.

133. A method according to claim 125, wherein after judging that the output data as reduced in amount cannot be printed in said printing apparatus, said judging step judges whether the output data as developed into bit map data in said information processing apparatus can be printed in said printing apparatus.

134. A method according to claim 126, wherein after judging that the output data as reduced in amount cannot be printed in said printing apparatus, said judging step judges whether the output data as developed into bit map data in said information processing apparatus can be printed in said printing apparatus.

135. A method according to claim 119, wherein said information processing apparatus further comprises the step of determining a memory size of said memory means based on the memory capacity acquired in said acquiring step and a capacity of the output data, the memory size being required to execute a drawing process based on the output data.

136. A method according to claim 135, further comprising the step of instructing the external apparatus to reserve a memory space having the memory size determined in said determining step.

137. A memory medium storing an information processing program which outputs data to an external apparatus having a memory, comprising:
  code to acquire a memory capacity memory of the external apparatus available for a printing process;
  code to judge whether output data to be outputted to the external apparatus can be printed in the external apparatus, based on the output data and the memory capacity acquired; and
  code to provide a notification that the output data cannot be printed, when it is judged that the output data cannot be printed.

138. A memory medium according to claim 137, wherein said the code to judge judges whether the output data can be developed into one page of bit map data in the memory of the external apparatus.

139. A memory medium according to claim 137, wherein after judging that the output data cannot be printed in the external apparatus, it is judged whether the output data can be printed in band control.

140. A memory medium according to claim 138, wherein after judging that the output data cannot be developed into one page of bit map data in the memory of the external apparatus, it is judged whether the output data can be printed in band control.

141. A memory medium according to claim 137, wherein after judging that the output data cannot be printed in the external apparatus, it is judged whether the output data as reduced in amount can be printed in the external apparatus.

142. A memory medium according to claim 138, wherein after judging that the output data cannot be developed into one page of bit map data in the memory of the external apparatus, it is judged whether the output data as reduced in amount can be printed in the external apparatus.

143. A memory medium according to claim 139, wherein after judging that the output data cannot be printed in band control, it is judged whether the output data as reduced in amount can be printed in the external apparatus.

144. A memory medium according to claim 140, wherein after judging that the output data cannot be printed in band control, it is judged whether the output data as reduced in amount can be printed in the external apparatus.

145. A memory medium according to claim 141, wherein after judging that the output data cannot be printed in the external apparatus, it is judged whether the output data as developed into bit map data in said information processing apparatus can be printed in the external apparatus.

146. A memory medium according to claim 138, wherein after judging that the output data cannot be developed into one page of bit map data in the memory of the external apparatus, it is judged whether the output data as developed into bit map data in said information processing apparatus can be printed in the external apparatus.

147. A memory medium according to claim 139, wherein after judging that the output data cannot be printed in band control, it is judged whether the output data as developed into bit map data in said information processing apparatus can be printed in the external apparatus.

148. A memory medium according to claim 140, wherein after judging that the output data cannot be printed in band control, it is judged whether the output data as developed into bit map data in said information processing apparatus can be printed in the external apparatus.

149. A memory medium according to claim 141, wherein after judging that the output data as reduced in amount cannot be printed in the external apparatus, it is judged whether the output data as developed into bit map data in said information processing apparatus can be printed in the external apparatus.

150. A memory medium according to claim 142, wherein after judging that the output data as reduced in amount cannot be printed in the external apparatus, it is judged whether the output data as developed into bit map data in said information processing apparatus can be printed in the external apparatus.

151. A memory medium according to claim 143, wherein after judging that the output data as reduced in amount cannot be printed in the external apparatus, it is judged whether the output data as developed into bit map data in said information processing apparatus can be printed in the external apparatus.

152. A memory medium according to claim 144, wherein after judging that the output data as reduced in amount cannot be printed in the external apparatus, it is judged whether the output data as developed into bit map data in said information processing apparatus can be printed in the external apparatus.

153. A memory medium according to claim 137, further comprising code to determine a memory size of the memory of the external apparatus based on the memory capacity acquired and a capacity of the output data, the memory size being required to execute a drawing process based on the output data.

154. A memory medium according to claim 153, further comprising code to instruct the external apparatus to reserve a memory space having the memory size determined.

155. A memory medium storing an information processing program for processing information in an information processing system comprised by a printing apparatus having a memory means and an information processing apparatus connected to the printing apparatus through a bi-directional interface, for outputting data to the printing apparatus, comprising:
    code to acquire a memory capacity of said printing apparatus available for a printing process;
    code to judge whether output data to be outputted to said printing apparatus can be printed in said printing apparatus, based on the output data and the memory capacity acquired;
    code to provide a notification that the output data cannot be printed, when said code to judge judges that the output data cannot be printed.

156. A memory medium according to claim 155, wherein said code to judge judges whether the output data can be developed into one page of bit map data in said memory means.

157. A memory medium according to claim 155, wherein after judging that the output data cannot be printed in said printing apparatus, it is judged whether the output data can be printed in band control.

158. A memory medium according to claim 156, wherein after judging that the output data cannot be developed into one page of bit map data in said memory means, it is judged whether the output data can be printed in band control.

159. A memory medium according to claim 155, wherein after judging that the output data cannot be printed in said printing apparatus, it is judged whether the output data as reduced in amount can be printed in said printing apparatus.

160. A memory medium according to claim 156, wherein after judging that the output data cannot be developed into one page of bit map data in said memory means, it is judged whether the output data as reduced in amount can be printed in said printing apparatus.

161. A memory medium according to claim 157, wherein after judging that the output data cannot be printed in band control, it is judged whether the output data as reduced in amount can be printed in said printing apparatus.

162. A memory medium according to claim 158, wherein after judging that the output data cannot be printed in band control, it is judged whether the output data as reduced in amount can be printed in said printing apparatus.

163. A memory medium according to claim 155, wherein after judging that the output data cannot be printed in said printing apparatus, it is judged whether the output data as developed into bit map data in said information processing apparatus can be printed in said printing apparatus.

164. A memory medium according to claim 156, wherein after judging that the output data cannot be developed into one page of bit map data in said memory means, it is judged whether the output data as developed into bit map data in said information processing apparatus can be printed in said printing apparatus.

165. A memory medium according to claim 157, wherein after judging that the output data cannot be printed in band control, it is judged whether the output data as developed into bit map data in said information processing apparatus can be printed in said printing apparatus.

166. A memory medium according to claim 158, wherein after judging that the output data cannot be printed in band control, it is judged whether the output data as developed into bit map data in said information processing apparatus can be printed in said printing apparatus.

167. A memory medium according to claim 159, wherein after judging that the output data as reduced in amount cannot be printed in said printing apparatus, it is judged whether the output data as developed into bit map data in said information processing apparatus can be printed in said printing apparatus.

168. A memory medium according to claim 160, wherein after judging that the output data as reduced in amount cannot be printed in said printing apparatus, it is judged whether the output data as developed into bit map data in said information processing apparatus can be printed in said printing apparatus.

169. A memory medium according to claim 161, wherein after judging that the output data as reduced in amount cannot be printed in said printing apparatus, it is judged whether the output data as developed into bit map data in said information processing apparatus can be printed in said printing apparatus.

170. A memory medium according to claim 162, wherein after judging that the output data as reduced in amount cannot be printed in said printing apparatus, it is judged whether the output data as developed into bit map data in said information processing apparatus can be printed in said printing apparatus.

171. A memory medium according to claim 155, further comprising code to determine a memory size of said memory means based on the memory capacity acquired and a capacity of the output data, the memory size being required to execute a drawing process based on the output data.

172. A memory medium according to claim 171, further comprising code to instruct the external apparatus to reserve a memory space having the memory size determined.

* * * * *

UNITED STATES PATENT AND TRADEMARK OFFICE
CERTIFICATE OF CORRECTION

PATENT NO. : 5,825,993

DATED : October 20, 1998

INVENTOR(S) : AKIHIRO SHIMURA, ET AL.

It is certified that error appears in the above-identified patent and that said Letters Patent is hereby corrected as shown below:

COLUMN 3:

Line 61, "denotes" should read --denote--;
    Line 62, "serves" should read --serve--; and
    Line 65, "denote" should read --denotes--.

COLUMN 5:

Line 15, "denoted" should read --denotes--, and "uses" should read --used--; and
    Line 59, "determined" should read --determines--.

COLUMN 7:

Line 11, "process" should read --processes--; and
    Line 56, "to" should read --is--.

COLUMN 8:

Line 27, before "transferring" should be inserted --for--.

UNITED STATES PATENT AND TRADEMARK OFFICE
CERTIFICATE OF CORRECTION

PATENT NO. : 5,825,993
DATED : October 20, 1998
INVENTOR(S) : AKIHIRO SHIMURA, ET AL.

It is certified that error appears in the above-identified patent and that said Letters Patent is hereby corrected as shown below:

COLUMN 10:

Line 15, "sizes," should read --size,--.

COLUMN 14:

Line 39, "sa id" should read --said--.

COLUMN 22:

Line 12, "acquired;" should read --acquired; and--.

Signed and Sealed this

Fifteenth Day of June, 1999

*Attest:*

Q. TODD DICKINSON

*Attesting Officer*  *Acting Commissioner of Patents and Trademarks*